(12) United States Patent
Kuntimaddi

(10) Patent No.: US 7,534,849 B2
(45) Date of Patent: May 19, 2009

(54) COMPOSITIONS FOR USE IN GOLF BALLS

(75) Inventor: Manjari Kuntimaddi, Plymouth, MA (US)

(73) Assignee: Acushnet Company, Fairhaven, MA (US)

( * ) Notice: Subject to any disclaimer, the term of this patent is extended or adjusted under 35 U.S.C. 154(b) by 147 days.

(21) Appl. No.: 11/162,555

(22) Filed: Sep. 14, 2005

(65) Prior Publication Data

US 2006/0004153 A1    Jan. 5, 2006

Related U.S. Application Data

(63) Continuation-in-part of application No. 10/859,539, filed on Jun. 2, 2004, now Pat. No. 7,138,475.

(51) Int. Cl.
*A63B 37/12* (2006.01)
*A63B 37/00* (2006.01)
*C08G 18/32* (2006.01)
*C08G 18/74* (2006.01)

(52) U.S. Cl. .............. 528/68; 528/74; 473/378
(58) Field of Classification Search ............ None
See application file for complete search history.

(56) References Cited

U.S. PATENT DOCUMENTS

| 4,830,378 | A | * | 5/1989 | Aoyama | 473/384 |
|---|---|---|---|---|---|
| 5,971,870 | A | * | 10/1999 | Sullivan et al. | 473/373 |
| 6,486,261 | B1 | * | 11/2002 | Wu et al. | 525/332.6 |
| 6,750,367 | B2 | | 6/2004 | Adkins et al. | |
| 2004/0097653 | A1 | * | 5/2004 | Kim et al. | 525/130 |
| 2004/0138007 | A1 | * | 7/2004 | Kim et al. | 473/371 |
| 2004/0254298 | A1 | * | 12/2004 | Kim et al. | 525/92 C |

* cited by examiner

*Primary Examiner*—David Buttner
(74) *Attorney, Agent, or Firm*—Mandi B. Milbank

(57) ABSTRACT

A golf ball having a core and at least one layer disposed about the core is disclosed. The at least one layer is formed from a composition having multiple reactive and/or non-reactive ingredients. At least one of these ingredients is an isocyanate having a fused or bridge cyclic structure that is partially alicyclic and partially aromatic.

3 Claims, No Drawings

COMPOSITIONS FOR USE IN GOLF BALLS

CROSS-REFERENCE TO RELATED APPLICATIONS

This application is a continuation-in-part of U.S. application Ser. No. 10/859,539, filed Jun. 2, 2004, now U.S. Pat. No. 7,138,475, the disclosure of which is incorporated herein by reference in its entirety.

FIELD AND BACKGROUND

The present disclosure is directed to compositions for use in golf ball that has superior resistance to water and moisture vapor in comparison to conventional materials, and golf balls formed from such compositions. One conventional material used to form golf ball covers is balata, a natural or synthetic trans-polyisoprene rubber. The softness of the balata cover allows the player to achieve spin rates sufficient to more precisely control ball direction and distance, particularly on shorter shots. However, balata covers lack the durability required by the average golfer, and are easily damaged. Accordingly, alternative cover compositions have been developed in an attempt to provide balls with spin rates and a feel approaching those of balata covered balls, while also providing a golf ball with a higher durability and overall distance.

Ionomer resins (e.g., copolymers of olefin, such as ethylene, and ethylenically unsaturated carboxylic acids, such as (meth)acrylic acids, wherein the acid groups are partially or fully neutralized by metal ions) have also been used as golf ball cover materials. Ionomer covers may be virtually cut-proof, but in comparison to balata covers, they display inferior spin and feel properties.

Polyurethanes and polyureas, by providing soft "feel," have also been recognized as useful materials for golf ball covers. However, commercially available polyurethane and polyurea compositions have properties that are undesirable for use in golf balls. For example, certain polyisocyanates and polyamines have poor weatherability, particularly prone to yellowing when exposed to UV irradiation and/or water/moisture. Some of these reagents are very volatile and pose health risks during handling and processing.

Therefore, a continuing need remains for novel material compositions usable in forming golf ball portions (e.g., covers) having desirable and/or optimal combination of physical and performance characteristics. Compositions comprising polyisocyanates and polyamines having aromatic structures and cycloaliphatic structures, such as those disclosed herein, may be suitable for forming one or more portions of the golf ball.

SUMMARY

This disclosure is directed to a golf ball having a core and at least one layer (e.g., cover layer) disposed about the core. Optionally, the golf ball further comprises an outer cover layer disposed about the at least one layer, or an intermediate layer disposed between the core and the at least one layer. The core may have a diameter of 1 inch or greater. The at least one layer may have a thickness of 0.005 inches to 0.1 inches. The core may be a solid core having a compression of 40 to 100 and/or a coefficient of restitution of 0.7 or greater. The at least one layer may have a flexural modulus of 1,000 psi to 100,000 psi or a Shore D hardness of 90 or less. The golf ball may have a coefficient of restitution of 0.7 or greater.

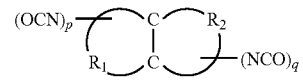

The at least one layer may be formed from a composition comprising an isocyanate having a fused or bridge cyclic structure that is partially alicyclic and partially aromatic. The isocyanate may have the above structure, where $R_1$ is an aliphatic, linear or branched, unsubstituted or substituted, divalent radical having one or more carbon atoms, optionally having one or more heteroatoms, $R_1$ and the two carbon common ring members form an alicyclic structure; $R_2$ is an unsaturated, linear or branched, unsubstituted or substituted, divalent radical having one or more carbon atoms, optionally having one or more heteroatoms, $R_2$ and the two carbon common ring members form an aromatic structure; R is the same or different monovalent radicals chosen from H and organic radicals having at least one carbon atom; p and q are the same or different whole numbers, and $p+q \geq 1$. Preferably, the isocyanate may be chosen from 2- and 3-isocyanato-tetrahydronaphthalenes, 2,3-, 2,4-, 2,5-, and 3,4-diisocyanato-tetrahydronaphthalenes. The composition may further comprise one or more polyahis. In one example, the composition further comprises a telechelic polyahl which react with the isocyanate to form an isocyanate-containing prepolymer having a % NCO of 15% or less. In another example, the composition forms a thermoset material. In a further example, the composition forms a thermoplastic material.

DETAILED DESCRIPTION

Broadly, the present disclosure is directed to golf balls comprising compositions formed at least in part from one or more (poly)isocyanates and/or (poly)amines being partially aromatic and partially alicyclic. That is, each of such compounds has one, two, or more isocyanate or amine groups, one or more aromatic ring structures, and one or more alicyclic ring structures, and each of the aromatic or alicyclic ring structures may be partially or fully substituted or unsubstituted. The isocyanate or amine (primary or secondary) groups may be direct substituents on one or more of the aromatic and/or alicyclic ring structures, or may be connected to one or more of the aromatic and/or alicyclic ring structures via divalent or higher polyvalent radicals. Two or more of the isocyanate groups may be connected to the aromatic and/or alicyclic ring structure in the same way or differently. Each of the cyclic structures (aromatic or alicyclic) may independently be monocyclic (i.e., single rings) or polycyclic (including bridged cyclics, spiro cyclics, fused cyclics, and ring assemblies). One or more of the aromatic ring structures and one or more of the alicyclic ring structures may in combination form one or more polycyclic structures (e.g., spiro cyclics, fused cyclics).

Specifically, the one or more aromatic ring structures may be free of isocyanate or amine substitutions. One or more of the isocyanate or amine groups may be direct substituents on the same or different aromatic ring structures. One or more of the isocyanate or amine groups may be connected to the same or different aromatic ring structures via the same, identical, or different non-alicyclic organic radicals. The one or more alicyclic ring structures may be free of isocyanate or amine substitutions. One or more of the isocyanate or amine groups may be direct substituents on the same or different alicyclic ring structures. One or more of the isocyanate or amine groups may be connected to the same or different alicyclic ring structures via the same, identical, or different non-aromatic organic radicals. Combinations of two or more of the arrangements described above may be present in the same (poly)isocyanate or (poly)amine.

In one example, the (poly)isocyanate or (poly)amine has a fused or bridged cyclic structure that is partially aromatic and partially alicyclic, and has one, two, or more isocyanate or amine groups as direct or indirect substituents on the aromatic and/or alicyclic rings. Non-limiting structures of such (poly) isocyanates and (poly)amines are shown below, where $R_1$ is an aliphatic, linear or branched, unsubstituted or substituted (e.g., (per)halogenated), divalent radical having one or more (e.g., 2, 3, 4, or more) carbon atoms, preferably 20 or less carbon atoms, more preferably 12 or less carbon atoms, optionally having one or more heteroatoms (e.g., O, N, S, Si, for example as ring members), $R_1$ and the two carbon common ring members form the alicyclic structure; $R_2$ is an unsaturated, linear or branched, unsubstituted or substituted (e.g., (per)halogenated), divalent radical having one or more (e.g., 2, 3, 4, or more) carbon atoms, preferably 20 or less carbon atoms, more preferably 12 or less carbon atoms, optionally having one or more heteroatoms (e.g., O, N, S, Si, for example as ring members), $R_2$ and the two carbon common ring members form the aromatic structure; R is the same or different monovalent radicals chosen from H and organic radicals having at least one carbon atom, preferably 20 or less carbon atoms, more preferably 12 or less carbon atoms, most preferably lower alkyls; p and q are the same or different whole numbers (e.g., 0, 1, 2, 3, or greater), and $p+q \geq 1$.

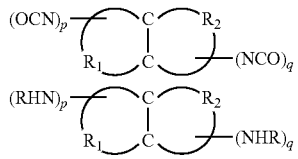

Preferably, $R_1$ is an alkylene radical, optionally having one or more alkyl and/or (per)haloalkyl substitutions. When $R_1$ is tetramethylene, and $R_2$ is —$C_4H_2$— or —$C_4H_3$—, the structures above depict, without limitation, 2- and 3-isocyanato-tetrahydronaphthalenes, 2,3-, 2,4-, 2,5-, and 3,4-diisocyanato-tetrahydronaphthalenes, 2- and 3-amino-tetrahydronaphthalenes, 2,3-, 2,4-, 2,5-, and 3,4-diamino-tetrahydronaphthalenes.

In another example, the (poly)isocyanate or (poly)amine has at least one aromatic structure connected to at least one alicyclic structure via a covalent bond or a divalent or polyvalent (e.g., trivalent, tetravalent) radical having a molecular weight of at least 10 (e.g., 12, 14, 16, or greater), preferably 10,000 or less, more preferably 5,000 or less, further preferably 3,000 or less. One, two, or more isocyanate or amine groups are connected to the aromatic structure and/or the alicyclic structure via covalent bonds and/or divalent radicals having a molecular weight of at least 12. Non-limiting structures of such (poly)isocyanates and (poly)amines are shown below, where $Z^1$ is a divalent radical having a molecular weight of 10 to 10,000, having at least one atom chosen from B, C, N, O, S, and Si, preferably having one or more $C_{1-20}$ alkylene radical; $Z^2$ and $Z^3$ are the same or different divalent radicals each comprising one or more linkages chosen from ether, ester, amide, urethane, and urea; Z is the same or different monovalent radicals chosen from H, halogens, alkyls and substituted alkyls (e.g., (per)haloalkyls) having one or more carbon atoms, preferably 20 or less carbon atoms, more preferably 12 or less carbon atoms, most preferably 6 or less carbon atoms; Y is the same or different monovalent radicals each having one or more isocyanate groups or amine groups (primary or secondary), optionally one or more of the isocyanate groups or the amine groups is connected to the aromatic or alicyclic structures via $C_{1-20}$ divalent radicals (including linear and branched ones), preferably $C_{1-6}$ alkylene or substituted alkylene (e.g., (per)haloalkylene) radicals; r, s, and t are the same or different whole numbers of 0 or 1; m, n, x, and y are the same or different whole numbers of 0, 1, 2, 3, 4, and 5, $m+n=x+y=5$, $m+x \geq 1$, preferably $m+x \geq 2$.

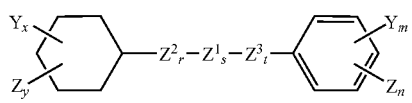

The compositions that incorporate one or more of the above-described (poly)isocyanates and/or (poly)amines may form thermoplastic, thermoset, castable, millable, or foamable (intumescent or swellable) materials. Preferably, the materials are elastomers having urethane and/or urea linkages (e.g., polyurethanes, polyureas, poly(urethane-urea)s). In forming the compositions of the present disclosure, the (poly) isocyanates or (poly)amines may be used as a non-reactive component. That is, the composition is substantially free of ingredients that are capable of reacting with the (poly)isocyanates or (poly)amines, such as isocyanates and polyahis. Alternatively, the (poly)isocyanates and/or (poly)amines may be used in a reactive, preferably liquid, composition where the (poly)isocyanates and/or (poly)amines react with one or more other ingredients by forming organic linkages (e.g., urea, amide). In one example, the reactive composition comprises an isocyanate-containing prepolymer having a % NCO of 15% or less, formed from a telechelic polyahl and a polyisocyanate described above, or a blend of two or more, or a blend of at least one of the polyisocyanate described above and at least one polyisocyanate described in the parent application. The isocyanate-containing prepolymer then reacts with a curative (e.g., polyahis) to form the resulting material (e.g., polyurethanes, polyureas).

In one example, the reactive composition comprises one, or a blend of two or more, of the polyamines, an isocyanate or a blend of two or more isocyanates, and optionally a curative (e.g., polyahis). The polyamines may form one or more hard segments of the resulting material (e.g., polyurethanes, polyureas) when the isocyanate is an isocyanate-containing prepolymer formed from a polyisocyanate and a polyahl, preferably a telechelic polyahl as described herein and in the parent application. Alternatively, the polyamines may form one or more soft segments of the resulting material by reacting with a polyisocyanate to form an isocyanate-containing prepolymer. Isocyanate-containing prepolymers may have a % NCO of 15% or less (e.g., 10.9% to 12.1%), preferably 10% or less (e.g., 8% to 9.7%, 6% to 9%), more preferably 7.5% or less (e.g., 4% to 5%), but not less than 2% (e.g., 2.1% to 3.2%, 2.7% to 4.2%). Combination of low % NCO and low isocyanate functionality in the prepolymer (e.g., 2.5 or less) may render the prepolymer difficult to process. In such situations, plasticizers like soybean oil, dioctylphthalate, and other phthalates may be blended with the prepolymer to reduce viscosity.

The polyamines may be used singly or in blends of two or more thereof when forming the isocyanate-containing prepolymer. Preferably, one or more of the polyamines may be blended with one or more telechelic polyahis (e.g., polyhydrocarbon polyahis, polyether polyahis, polyester polyahis) disclosed in the parent application prior to reacting with the polyisocyanate. Suitable telechelic polyahis to blend with the polyamines are preferably compatible telechelic polyahis. In such blends, the weight ratio of the polyamines to the compatible telechelic polyahis depends on the miscibility of the two, and may be 10:1 to 1:10.

Non-limiting examples of conventional polyisocyanates (including diisocyanates) for use in combination with the (poly)isocyanates described above in the compositions of the present disclosure include those disclosed in the parent applications. In one example, saturated polyisocyanates (including aliphatic and cycloalipahtic polyisocyanates) are preferred for enhanced weatherability. In another example, aromatic polyisocyanates, particularly those that are free of non-aromatic unsaturations, are preferred for forming highly resilient materials (e.g., having a percentage of rebound of 60% or greater). To form thermoplastic materials, diisocyanates and uretdiones of diisocyanates are preferred choices. To form thermoset materials, higher polyisocyanates such as triisocyanates, tetraisocyanates, biurets and isocyanurates of diisocyanates may be preferred.

The (poly)amines described above may be used singly or in blends of two or more thereof when used as curatives to react with isocyanate-containing prepolymers. Preferably, one or more of the (poly)amines may be blended with one or more polyahis (e.g., polyols, polyamines) disclosed in the parent application prior to reacting with the prepolymer. Non-limiting examples of curatives, especially polyahis, for use in the compositions of the present disclosure include those disclosed in the parent application. Suitable polyahis to blend with the (poly)amines are preferably compatible polyahis. In such blends, the weight ratio of the (poly)amines to the compatible polyahis depends on the miscibility of the two, and may be 10:1 or less, preferably 4:1 or less, more preferably 2:1 or less, further preferably 1:1 or less, typically 1:20 or greater, preferably 1:10 or greater, more preferably 1:3 or greater.

The materials formed from the compositions comprising at least one of the (poly)isocyanates and/or (poly)amines described above, and optionally one or more polyisocyanates, telechelic polyahl, and other polyahis may be used to form one or more portions (e.g., thin barrier layers, inner and/or outer cover layers) of the golf ball, utilizing some or all of the enhanced properties such as ease to process and reduced material hardness. In one example, the material has a Shore A hardness of 70 or less. The materials may have 15 weight percent to 50 weight percent of hard segments by weight of the material. The material may have a percentage of rebound of 60% or greater.

A variety of additives can optionally be incorporated into the compositions of the present disclosure, or any one or more of the subcomponents thereof. These additives include, but are not limited to, catalysts to alter the reaction rate, fillers to adjust density and/or modulus, processing aids or oils (such as reactive or non-reactive diluents) to affect rheological and/or mixing properties, reinforcing materials, impact modifiers, wetting agents, viscosity modifiers, release agents, internal and/or external plasticizers, compatibilizing agents, coupling agents, dispersing agents, crosslinking agents, defoaming agents, surfactants, lubricants, softening agents, coloring agents including pigments and dyes, optical brighteners, whitening agents, UV absorbers, hindered amine light stabilizers, blowing agents, foaming agents, and any other modifying agents known or available to one of ordinary skill in the art. One or more of these additives may be used in amounts sufficient to achieve their respective purposes and desired effects. Non-limiting examples of such additives and their appropriate amounts are disclosed in the parent application.

Conventional materials used for golf ball covers, intermediate layers, and cores may be blended with the compositions of the present disclosure, by about 1 weight percent to about 95 weight percent of the composition. Non-limiting examples of such materials are disclosed in the parent applications. Preferably, a thermoplastic composition of the present disclosure is used, optionally in a blend with one or more conventional thermoplastic materials.

The compositions disclosed herein above may be used to form, in whole or in part, one or more portions of the golf ball, such as a cover layer, an intermediate layer, a barrier layer, a coating layer, and the like. The golf ball cover layer or at least one sub-layer thereof (e.g., inner cover layer, outer cover layer) may preferably be formed from one of the compositions disclosed herein. The cover layer can have a thickness from 0.001 inches to 0.125 inches, preferably from 0.005 inches to 0.1 inches, more preferably from 0.01 inches to 0.05 inches, most preferably from 0.015 inches to 0.04 inches, like 0.035 inches. Alternatively, the thickness of the cover layer is 0.5 inches or less, preferably 0.05 inches to 0.2 inches, more preferably 0.05 inches to 0.1 inches. The cover layer may have a flexural modulus of 1,000 to 100,000 psi, preferably 1,000 psi to 80,000 psi, more preferably 1,000 to 50,000 psi, even preferably 1,000 psi to 30,000 psi, most preferably 2,000 psi to 25,000 psi, alternatively 10,000 psi to 80,000 psi. The Shore D hardness of the cover layer may be 90 or less, preferably 20 to 70, more preferably 20 to 60, further preferably from 25 to 55, even preferably from 30 to 55, most preferably from 40 to 55. The cover layer may preferably have a WVTR of about 2 g/(m$^2$×day) or less, The core of the golf ball may be solid, fluid-filled, gel-filled, or gas-filled, having a single-piece construction or a multi-piece construction that includes a center and one or more outer core layers. Non-limiting examples of materials and compositions suitable for forming the core or one or more layers of the core are disclosed in the parent applications. Preferred compositions for solid cores include a base rubber (e.g., polybutadiene rubbers having a 1,4-cis content of at least about 40%), a crosslinking agent (e.g., ethylenically unsaturated acids having 3 to 8 carbon atoms and metal salts thereof), an initiator (e.g., peroxides, carbon-carbon initiators, and blends of two or more thereof) and, optionally, one or more additives (e.g., CoR enhancer like halogenated organosulfur compounds).

The golf ball core may have a diameter of 0.5 inches or greater, preferably 1 inch or greater, more preferably 1.5 inches or greater, further preferably 1.54 inches or greater, even preferably 1.545 inches or greater, most preferably 1.55 inches or greater, typically about 1.65 or less, or about 1.6 inches or less. The core may have an Atti compression of 20 to 120, preferably 30 to 100, more preferably 40 to 90, further preferably 45 to 85, further preferably 50 to 80, further preferably 50 to 75, even more preferably 50 to 65, most preferably 55 to 60; alternatively, the compression may be 25 or less, or 20 or less. The core may have a CoR of 0.7 or greater, preferably 0.75 or greater, more preferably 0.77 or greater, further preferably 0.79 or greater, even more preferably 0.8 or greater, and most preferably 0.81 or greater. The core may comprise a center and one or more outer core layers. The outer core layer may have a thickness of 0.5 inches or less, preferably 0.3 inches or less, more preferably 0.25 inches to 0.3 inches.

One, two, or more optional intermediate layers may be disposed between the core and the cover. The intermediate layer may be part of the core as an outer core layer, or part of the cover as an inner cover layer. In one example, an intermediate layer can be formed from a hard, high flexural modulus, resilient material which contributes to the low spin, distance characteristics when they are struck for long shots (e.g. driver or long irons). The material of the intermediate layer can have a Shore D hardness of 65-80, preferably 69-74, more preferably 70-72. The flexural modulus of the intermediate layer can be at least 65,000 psi, preferably from 70,000 psi to 120,000 psi, more preferably from 75,000 psi to 100,000 psi. The thickness of the inner cover layer may be from 0.020 inches to 0.045 inches, preferably from 0.030 inches to 0.040 inches. The intermediate layer preferably has a WVTR lower than that of the cover. More preferably, the WVTR of the intermediate layer is no greater than that of an ionomer resin such as Surlyn®, which is in the range of about 0.45 g/(m$^2$× day) to about 0.95 g/(m$^2$×day). Non-limiting examples of suitable materials and compositions that form the intermediate layers are disclosed in the parent application.

The resultant golf balls typically have a CoR of about 0.7 or greater, preferably about 0.75 or greater, more preferably about 0.78 or greater, most preferably about 0.8 or greater. The golf balls also typically have an Atti compression of at least about 40, preferably from about 50 to 120, and more preferably from about 60 to 100. The golf balls typically have dimple coverage greater than about 60 percent, preferably greater than about 65 percent, and more preferably greater than about 75 percent. The diameter of the golf ball is preferably from 1.680 inches to 1.800 inches, more preferably from 1.680 inches to 1.760 inches, most preferably from 1.680 inches to 1.740 inches.

Golf balls of the present invention may have a variety of constructions, typically comprising at least a core and a cover. Optionally, one or more intermediate layers may be disposed between the core and the cover; the core may be a single solid mass, or include a solid, liquid-filled, gel-filled or gas-filled center and one or more outer core layers; and the cover may include an outer cover layer and one or more inner cover layers. Any of the outer core layers, the intermediate layers, or the inner cover layers may be a continuous layer, a discontinuous layer, a wound layer, a molded layer, a lattice network layer, a web or net, an adhesion or coupling layer, a barrier layer, a layer of uniformed or non-uniformed thickness, a layer having a plurality of discrete elements such as islands or protrusions, a solid layer, a metallic layer, a liquid-filled layer, a gas-filled layer, or a foamed layer.

The compositions for golf ball portions as disclosed herein may be used in sporting equipment in general. Specifically, the compositions may be applied in various game balls, golf club shafts, golf club head inserts, golf shoe components, and the like.

All patents and patent applications cited in the foregoing text are expressly incorporated herein by reference in their entirety.

The invention described and claimed herein is not to be limited in scope by the specific embodiments herein disclosed, since these embodiments are intended solely as illustrations of several aspects of the invention. Any equivalent embodiments and various modifications apparent to those skilled in the art are intended to be within the scope of this invention. It is further understood that the various features of the present invention can be used singly or in combination thereof. Such modifications and combinations are also intended to fall within the scope of the appended claims.

What is claimed is:

1. A golf ball comprising:
   a core having a diameter of 1 inch or greater; and
   at least one layer disposed about the core, wherein the layer has a thickness of from 0.005 inches to 0.1 inches and is formed from a polyurea composition, wherein the polyurea composition is formed from a composition comprising a (poly)amine having a fused or bridge cyclic structure that is partially alicyclic and partially aromatic, wherein the (poly)amine is selected from the group consisting of 2-amino-tetrahydronaphthalenes; 3-amino-tetrahydronaphthalenes; 2,3-diamino-tetrahydronaphthalenes; 2,4-diamino-tetrahydronaphthalenes; 2,5-diamino-tetrahydronaphthalenes; and 3,4-diamino-tetrahydronaphthalenes; and combinations thereof; and
   wherein the golf ball has a coefficient of restitution of 0.7 or greater.

2. The golf ball of claim 1, wherein the core is a solid core having a compression of 40 to 100 or a coefficient of restitution of 0.7 or greater, and the layer has a flexural modulus of 1,000 psi to 100,000 psi or a Shore D hardness of 90 or less.

3. The golf ball of claim 1, wherein the golf ball further comprises:
   an intermediate layer disposed between the at least one layer and the core; or an outer cover layer disposed about the at least one layer.

* * * * *